(12) United States Patent
Nakamura et al.

(10) Patent No.: US 9,724,989 B2
(45) Date of Patent: Aug. 8, 2017

(54) VEHICLE

(71) Applicant: Yamaha Hatsudoki Kabushiki Kaisha, Iwata-shi, Shizuoka (JP)

(72) Inventors: Shinichirou Nakamura, Shizuoka (JP); Fumihiro Hidaka, Shizuoka (JP); Eiichi Ito, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 99 days.

(21) Appl. No.: 14/585,360

(22) Filed: Dec. 30, 2014

(65) Prior Publication Data
US 2016/0185301 A1   Jun. 30, 2016

(51) Int. Cl.
| | | |
|---|---|---|
| *B60K 13/02* | (2006.01) | |
| *B60R 7/00* | (2006.01) | |
| *B60K 5/00* | (2006.01) | |
| *B60K 15/063* | (2006.01) | |
| *B62J 11/00* | (2006.01) | |
| *B60K 13/04* | (2006.01) | |
| *B62J 7/00* | (2006.01) | |

(52) U.S. Cl.
CPC .............. *B60K 5/00* (2013.01); *B60K 13/02* (2013.01); *B60K 15/063* (2013.01); *B62J 11/00* (2013.01); *B60K 13/04* (2013.01); *B60K 2005/003* (2013.01); *B60K 2015/0632* (2013.01); *B60Y 2200/124* (2013.01); *B62J 7/00* (2013.01)

(58) Field of Classification Search
CPC .... B60R 7/00; B60R 7/02; B60R 7/04; B60R 7/043; B60K 13/02; B62K 19/46
See application file for complete search history.

(56) References Cited

U.S. PATENT DOCUMENTS

| | | | | |
|---|---|---|---|---|
| 3,944,009 A | * | 3/1976 | Katagiri | B62J 35/00 180/219 |
| 4,535,869 A | * | 8/1985 | Tsutsumikoshi | B62K 5/01 180/215 |
| 4,666,015 A | * | 5/1987 | Matsuda | B60K 17/34 123/195 A |
| 4,723,620 A | * | 2/1988 | Ono | B62J 11/005 180/219 |
| 4,796,719 A | * | 1/1989 | Shiratsuchi | B60K 13/02 180/219 |

(Continued)

FOREIGN PATENT DOCUMENTS

| | | |
|---|---|---|
| JP | 01-178093 A | 7/1989 |
| JP | 2002-211463 A | 7/2002 |

OTHER PUBLICATIONS

Wikipedia.org internet encyclopedia entry for "Honda NC700 series" accessed Feb. 17, 2016.*

*Primary Examiner* — J. Allen Shriver, II
*Assistant Examiner* — Steve Clemmons
(74) *Attorney, Agent, or Firm* — Keating and Bennett, LLP

(57) ABSTRACT

A vehicle includes a storage case. The storage case includes an opening. The storage case is disposed above a cylinder portion, and the opening is disposed farther forward than the front end of the upper surface of the seat. An air cleaner and a fuel tank are disposed below the seat. According to such a vehicle, it is possible to ensure a space for the storage case anterior to the seat. As a result, it is possible to readily increase the capacity of the storage case. In addition, a rider is able to access the opening while sitting on the seat.

23 Claims, 12 Drawing Sheets

(56) References Cited

U.S. PATENT DOCUMENTS

| | | | | |
|---|---|---|---|---|
| 4,830,134 A * | 5/1989 | Hashimoto | B62J 35/00 | 180/219 |
| 4,940,111 A * | 7/1990 | Nogami | B62K 19/46 | 180/219 |
| 5,048,634 A * | 9/1991 | Shirasagi | B62K 19/46 | 180/219 |
| 5,396,867 A * | 3/1995 | Ito | F01L 3/205 | 123/196 R |
| 6,523,634 B1 * | 2/2003 | Gagnon | B60K 15/01 | 180/215 |
| 6,626,260 B2 * | 9/2003 | Gagnon | B60K 15/01 | 180/215 |
| 6,739,655 B1 * | 5/2004 | Schwochert | B62J 1/12 | 297/188.01 |
| 6,805,214 B2 * | 10/2004 | Maeda | B62J 35/00 | 180/220 |
| 7,216,912 B2 * | 5/2007 | Takeshima | B62K 19/46 | 224/544 |
| 7,338,105 B2 * | 3/2008 | Chung | B60R 7/02 | 180/219 |
| 7,740,100 B2 * | 6/2010 | Takahashi | B62K 5/01 | 180/311 |
| 8,037,958 B2 * | 10/2011 | McClendon | B60K 13/02 | 180/296 |
| 8,430,442 B2 * | 4/2013 | Utke | B60N 2/0284 | 296/65.02 |
| 8,567,542 B2 * | 10/2013 | Shiina | B62K 5/01 | 123/184.21 |
| 8,646,668 B2 * | 2/2014 | Oakes | B60R 9/065 | 224/401 |
| 8,794,687 B2 * | 8/2014 | Hiwatashi | B62K 19/46 | 224/413 |
| 9,315,227 B2 * | 4/2016 | Hayashi | B62J 35/00 | |
| 2002/0096377 A1 | 7/2002 | Kuji et al. | | |
| 2011/0108344 A1 * | 5/2011 | Bolich | B60K 15/073 | 180/69.4 |
| 2014/0117655 A1 * | 5/2014 | Hayashi | B62J 35/00 | 280/835 |

* cited by examiner

VEHICLE

BACKGROUND OF THE INVENTION

1. Field of the Invention

The present invention relates to a vehicle including a storage portion where accessories, such as tools, belongings of the riders, and the like are stored.

2. Description of the Related Art

Some saddle-riding type four wheel vehicles include a storage portion where accessories, such as tools, and belongings of the riders are stored. In the vehicles disclosed in Japanese Patent Laid-open Publication No. 2002-211463 and Japanese Patent Laid-open Publication No. 1999-178093, the storage portion is disposed anterior to the seat. This layout is convenient in that a rider can access the storage portion while riding on the vehicle.

According to the vehicle disclosed in Japanese Patent Laid-open Publication No. 2002-211463, an air cleaner that purifies the air to be supplied to the engine is also disposed anterior to the seat in addition to the storage portion. The air cleaner is disposed above the engine, and the storage portion is disposed above the air cleaner. Thus, this layout has a problem in that it is difficult to ensure a sufficient capacity of the storage portion.

The vehicle disclosed in Japanese Patent Laid-open Publication No. 1999-178093 as well includes an air cleaner disposed anterior to the seat. In this vehicle, the storage portion and the air cleaner are arranged in the front-back direction of the vehicle body. This layout as well has a problem in that it is difficult to ensure the capacity of the storage portion.

SUMMARY OF THE INVENTION

A vehicle according to a preferred embodiment of the present invention includes a seat; an engine arranged such that at least a front portion thereof is disposed farther forward than the seat; an air cleaner disposed below the seat and configured to purify air to be supplied to the engine; a fuel tank disposed below the seat and configured to store fuel to be supplied to the engine; and a storage portion disposed above the engine and including an opening configured such that an object is capable of being inserted into and removed from the storage portion, the opening being located farther forward than a front end of an upper surface of the seat. According to this vehicle, it is possible to ensure sufficient space for the storage portion in front of the seat. As a result, it is possible to readily increase the capacity of the storage portion. Further, as the opening of the storage portion is located farther forward than the front end of the upper surface of the seat, riders on the vehicle have easy access to the opening. This improves the convenience of using the storage portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
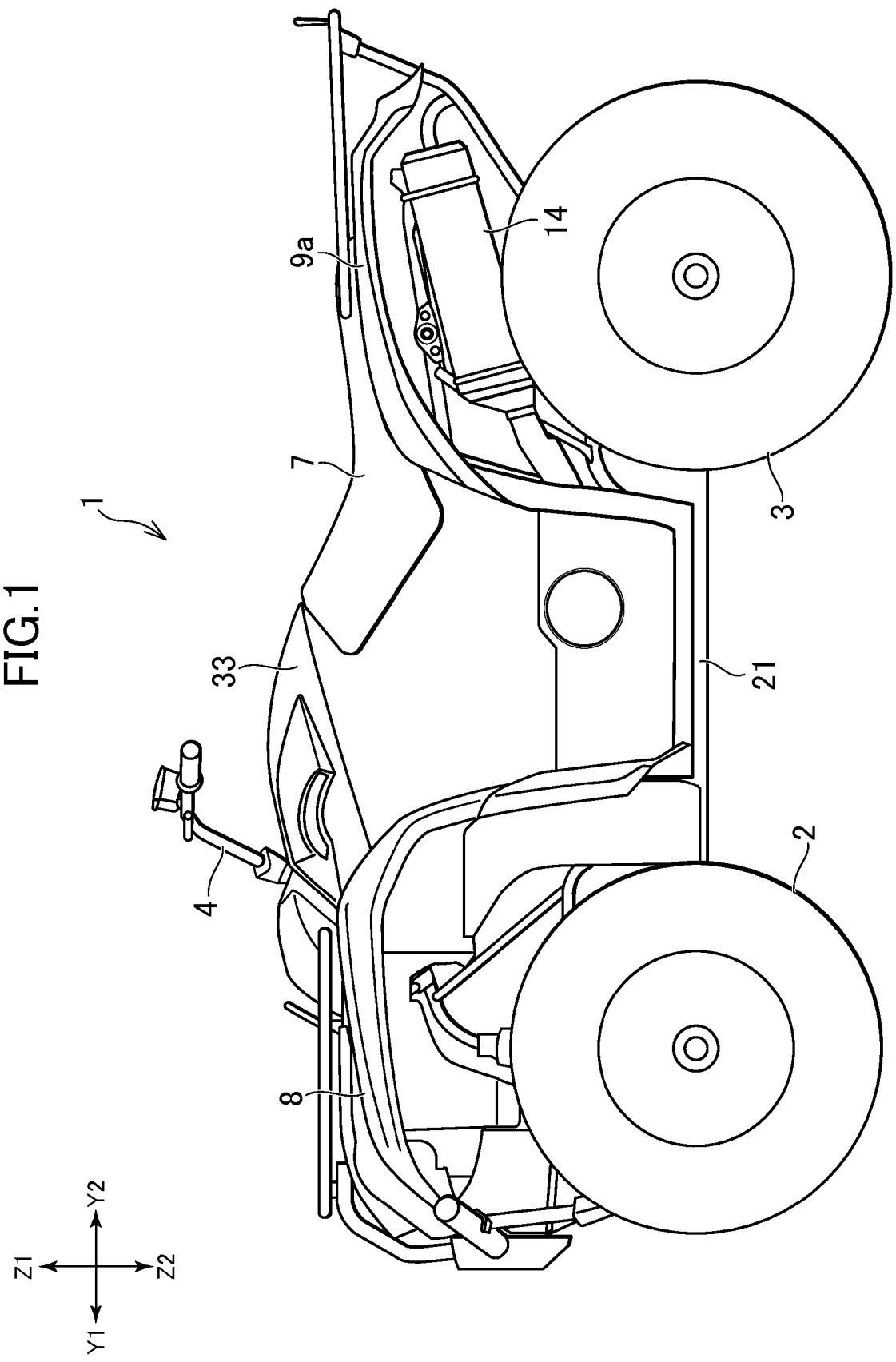
FIG. 1 is a side view of a saddle-riding type four wheel vehicle according to a preferred embodiment of the present invention.
Figure 2:
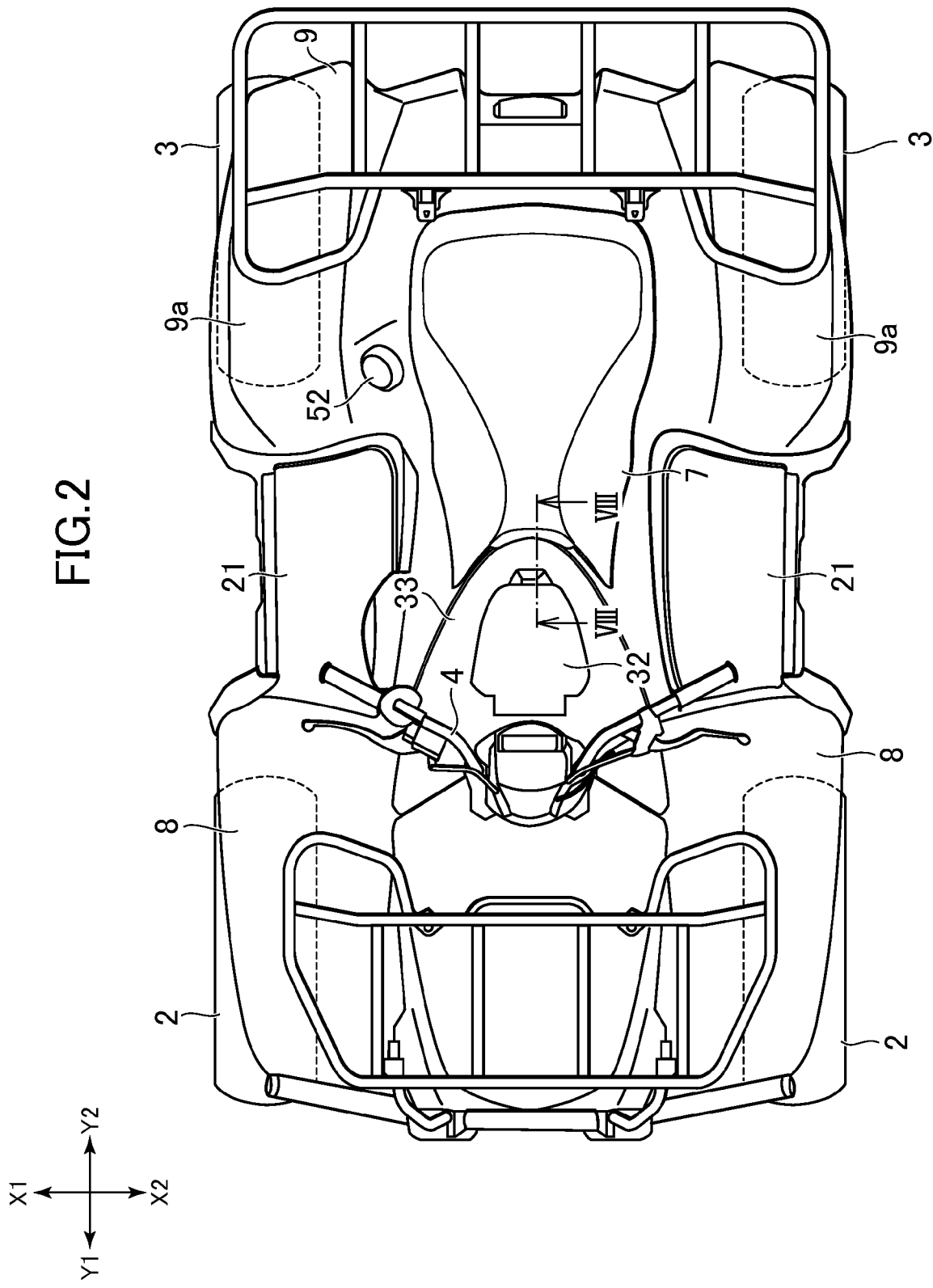
FIG. 2 is a plan view of a saddle-riding type four wheel vehicle.
Figure 3:
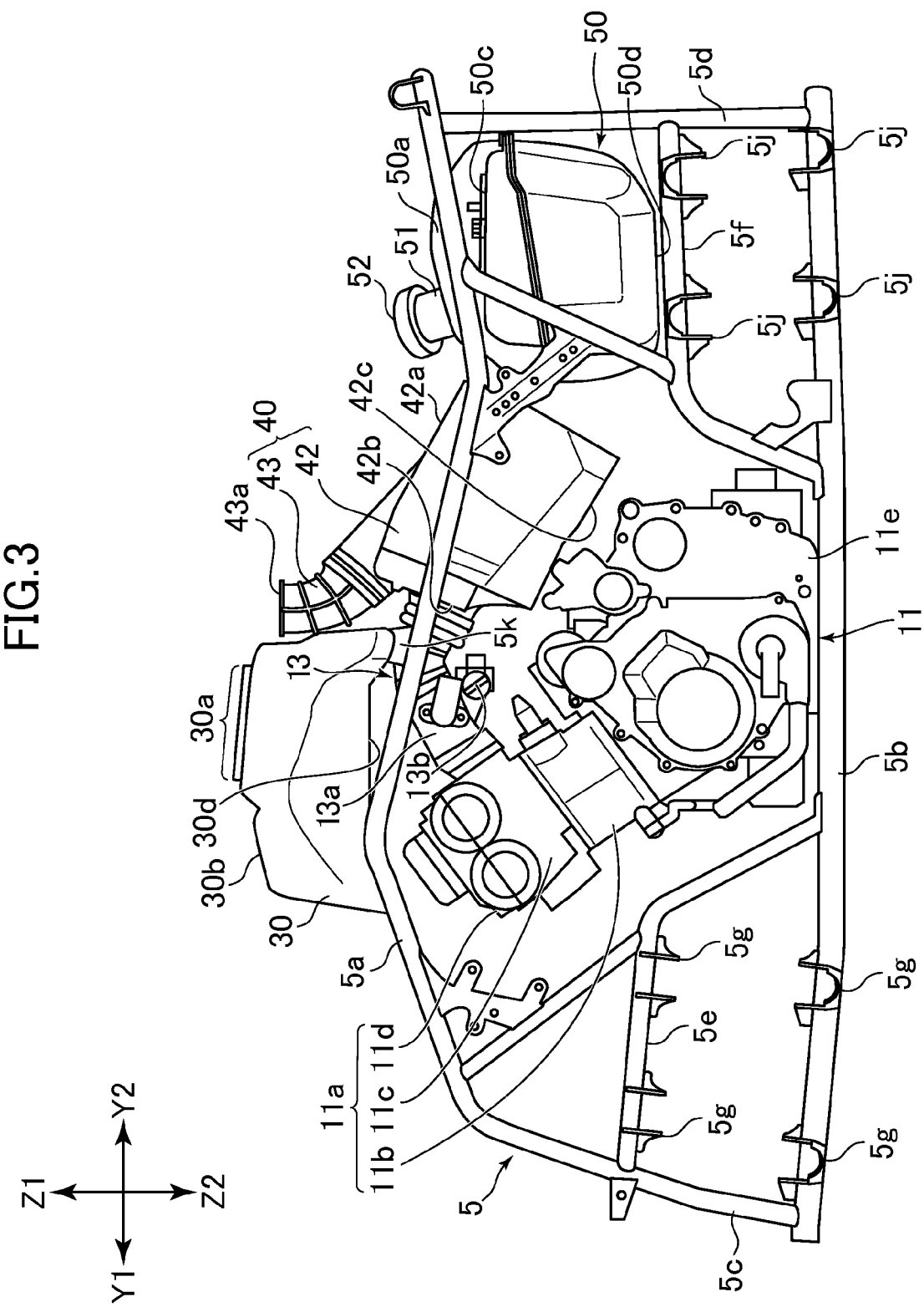
FIG. 3 is a side view showing an engine, a fuel tank, an air cleaner, and a storage case included in a saddle-riding type four wheel vehicle.
Figure 4:
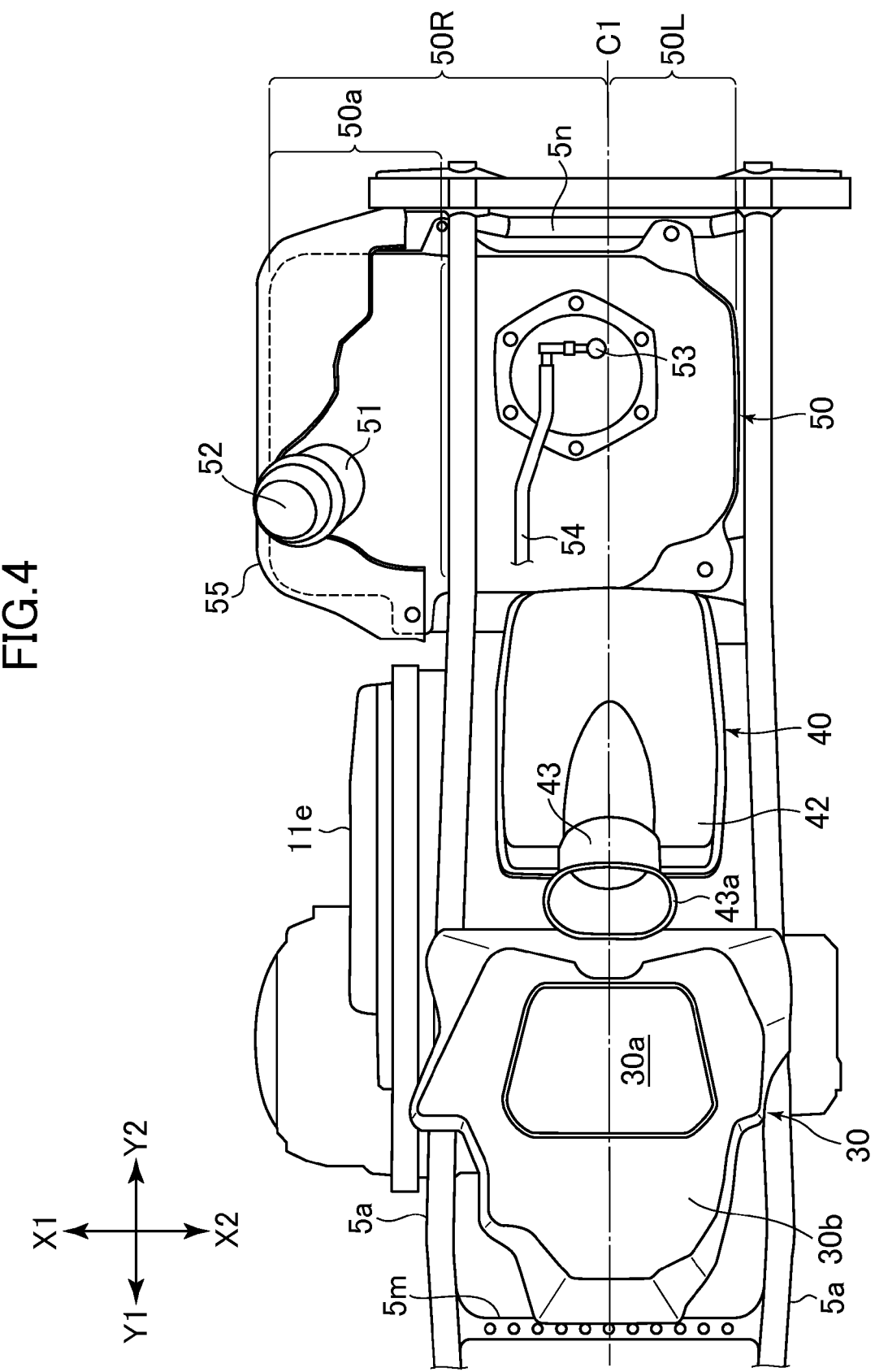
FIG. 4 is a plan view showing the devices shown in FIG. 3.
Figure 5:
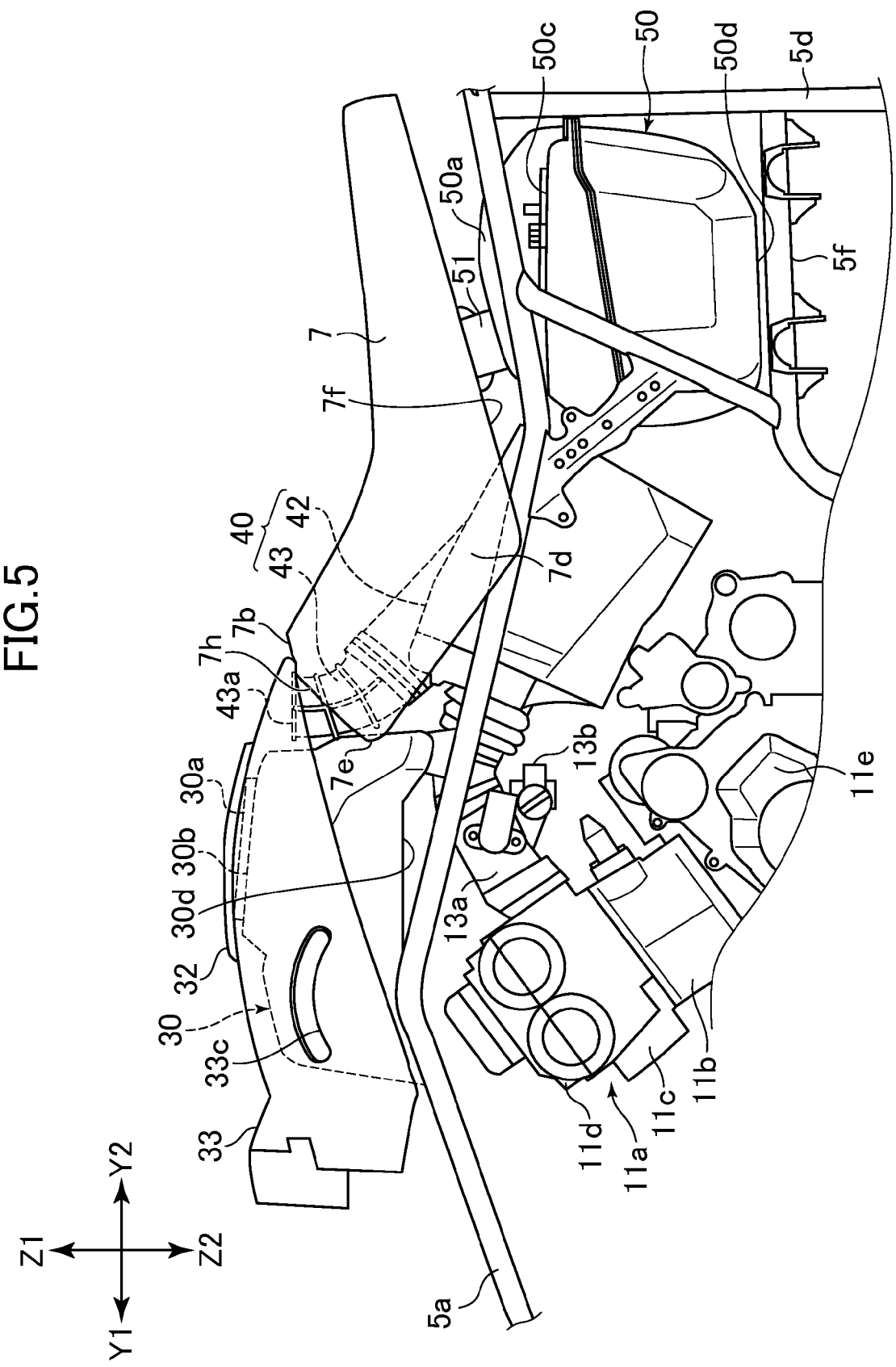
FIG. 5 is a side view showing an exterior cover and a seat in addition to the devices shown in FIG. 3.
Figure 6:
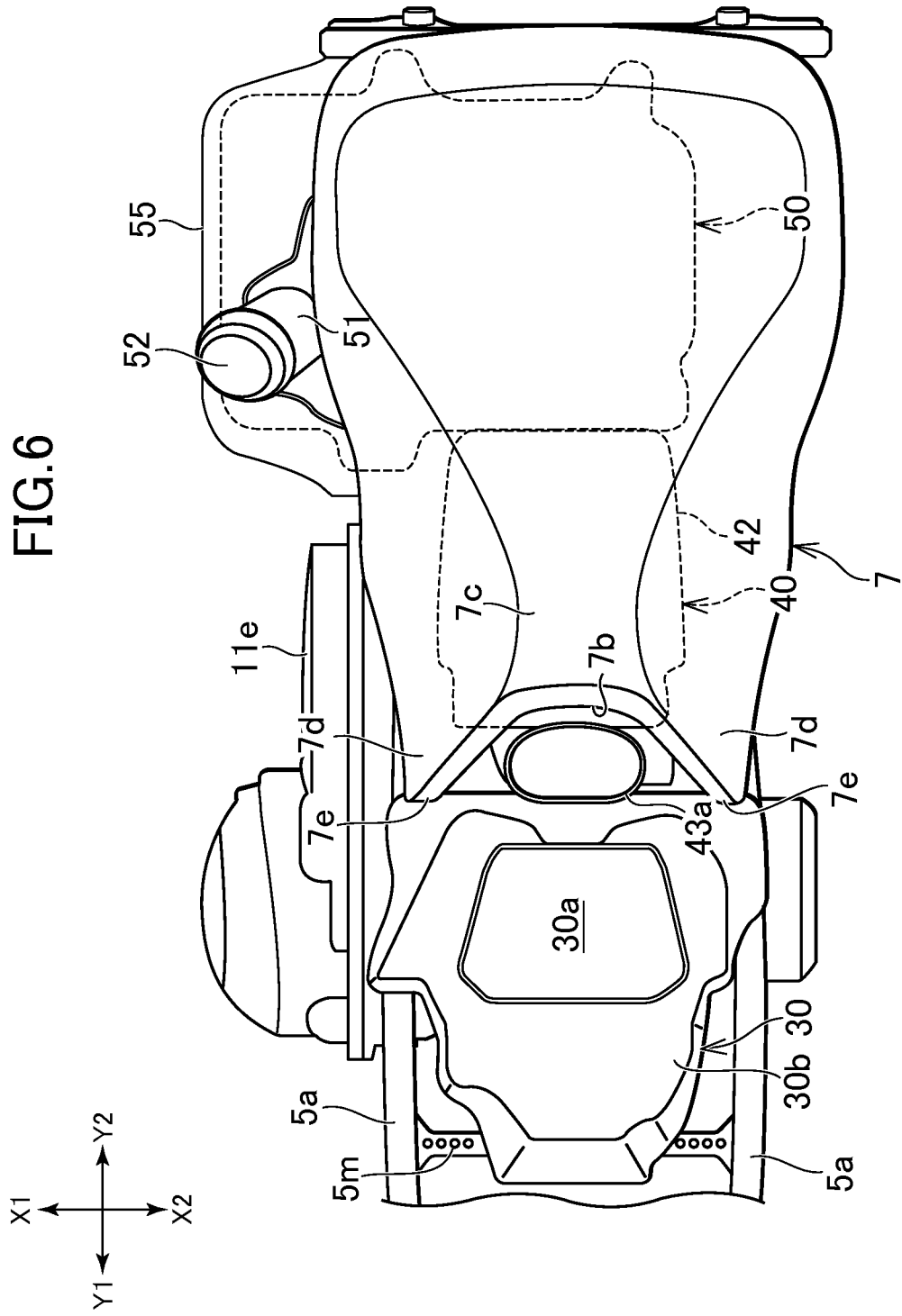
FIG. 6 is a side view of the fuel tank, the air cleaner, the storage case, and the seat.
Figure 7:
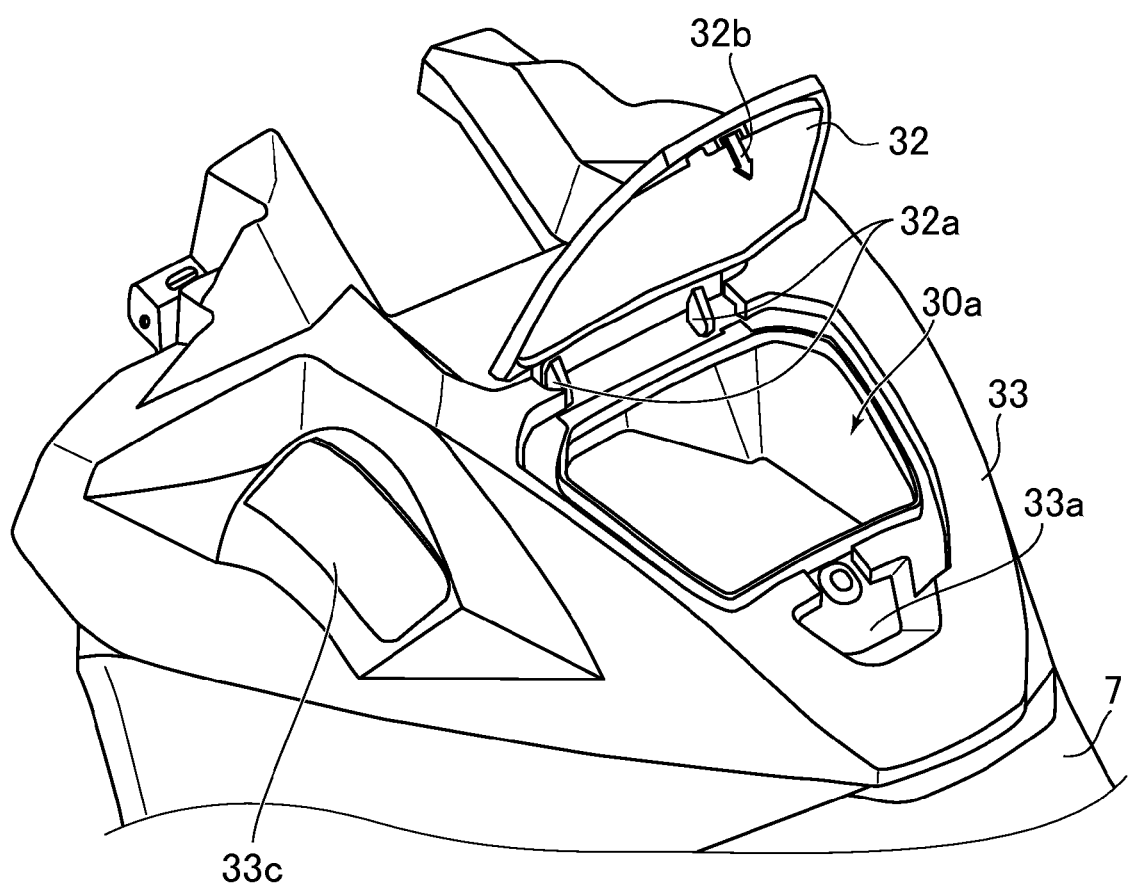
FIG. 7 is a perspective view showing the storage case and the cover covering the storage case.

In the following, preferred embodiments of the present invention will be described. FIG. 1 is a side view of a saddle-riding type four wheel vehicle 1 according to a preferred embodiment of the present invention. FIG. 2 is a plan view of the vehicle 1. FIG. 3 is a side view showing an engine 11, a fuel tank 50, an air cleaner 40, and a storage case 30 all equipped on the vehicle 1. FIG. 4 is a plan view showing the devices mentioned above (the storage case 30 corresponds to a "storage portion". FIG. 5 is a side view showing an exterior cover 33 and a seat 7 in addition to the devices shown in FIG. 3. FIG. 6 is a side view showing the fuel tank 50, the air cleaner 40, the storage case 30, and the seat 7. FIG. 7 is a perspective view showing the storage case 30 and the cover 33 covering the storage case 30.

Y1 and Y2 in FIG. 1 indicate the respective forward and rearward directions of the vehicle body, and Z1 and Z2 indicate the respective upward and downward directions of the vehicle body. X1 and X2 in FIG. 2 indicate the respective rightward and leftward directions of the vehicle body. The direction indicated by X1-X2 corresponds to the vehicle width direction.

As shown in FIGS. 1 and 2, the vehicle 1 includes a steering handle 4. The handle 4 is connected to the upper portion of a steering shaft (not shown), and linked to the left and right front wheels 2 via the steering shaft and a tie-rod (not shown). The left and right front wheels 2 are disposed on the respective left and right sides of the front portion of a vehicle frame 5, and supported by the vehicle frame 5 via arms so as to move up and down. The left and right front wheels 2 are covered by a fender 8.

As shown in FIG. 3, the engine 11 is disposed in a lower portion in the middle portion of the vehicle body. An output (rotation) of the engine 11 is transmitted to the left and right rear wheels 3 via a plurality of shafts (not shown). The left and right rear wheels 3 are disposed on the respective left and right sides of the rear portion of the vehicle frame 5, and supported by the vehicle frame 5 so as to move up and down. The left and right rear wheels 3 are covered by a fender portion 9a of an exterior cover 9.

The vehicle 1 includes the vehicle frame 5. As shown in FIG. 3, the vehicle frame 5 includes left and right lower frame portions 5b disposed in the lower portion of the vehicle body and extending in the front-back direction. The vehicle frame 5 further includes left and right upper frame portions 5a disposed in the upper portion of the vehicle body and extending in the front-back direction. The vehicle frame 5 still further includes a front frame portion 5c extending upward from the front end of the lower frame portion 5b toward the upper frame portion 5a, and a rear frame portion 5d extending upward from the rear end of the lower frame portion 5b toward the upper frame portion 5a.

The vehicle frame 5 further includes a front arm support portion 5e and a rear arm support portion 5f. The front arm support portion 5e is spaced upward from the front portion of the front frame portion 5b. Each front wheel 2 is supported via a plurality of arms linked to the front arm support portion 5e and the front portion of the lower frame portion 5b. The front arm support portion 5e and the front portion of the lower frame portion 5b include a plurality of arm link portions 5g to which the arms are linked. Meanwhile, the rear arm support portion 5f is spaced upward from the rear portion of the lower frame portion 5b. Each rear wheel 3 is supported via arms 16 linked to the rear arm support portion 5f and the rear portion of the lower frame portion 5b (see FIG. 9). The rear arm support portion 5f and the rear portion of the lower frame portion 5b include a plurality of arm link portions 5j to which the arms are linked. The structure of the vehicle frame 5, however, is not limited to the preferred embodiment shown in FIG. 5.

As shown in FIG. 3, the engine 11 includes a cylinder portion 11a disposed on the front portion thereof. The cylinder portion 11a includes a cylinder block 11b, a cylinder head 11c, and a cylinder head cover 11d. At least one cylinder is provided inside the cylinder block 11b. The cylinder head 11c includes an intake passage and an exhaust passage provided inside thereof and connected to the cylinder, and the cylinder head 11c is disposed on the upper side of the cylinder block 11b. The cylinder head cover 11d is disposed on the upper side of the cylinder head 11c. The engine 11 includes a case 11e on the lower portion thereof to accommodate a crank shaft, a clutch, a transmission, and the like.

The cylinder portion 11a extends upward from the front portion of the case 11e. The cylinder portion 11a is preferably inclined forward. However, the cylinder portion 11a may extend vertically.

The vehicle 1 includes a seat 7 on which a rider can sit straddling. The seat 7 is disposed on and supported by the left and right upper frame portions 5a. The engine 11 is arranged such that at least a front portion thereof is disposed farther forward than the seat 7. That is, the engine 11 is disposed such that at least the cylinder portion 11a is disposed farther forward than the seat 7. A portion (the rear end) of the cylinder portion 11a is preferably disposed farther rearward than the front end of the seat 7. The rear portion of the case 11e of the engine 11 is preferably located below the front portion of the seat 7 or farther forward than the seat 7.

As shown in FIG. 3, the vehicle 1 includes a storage case 30 configured to store objects, such as accessories, including tools, belongings of the riders, and the like. The storage case 30 includes an opening 30a (see FIGS. 4 and 7) through which a rider is capable of inserting and removing an object from the storage case 30. The storage case 30 is preferably disposed above the cylinder portion 11a, and the opening 30a is preferably located farther forward than the front end 7b of the upper surface of the seat 7 (see FIG. 6). The seat 7 includes a seat upper portion 7c defining the upper surface of the seat 7, and seat lateral portions 7d extend from the left and right sides of the seat upper portion 7c, respectively. As shown in FIG. 6, the front end 7e of each seat lateral portion 7d is positioned farther forward than the front end 7b of the upper surface of the seat 7. A portion of the opening 30a is preferably located farther rearward than the front end 7e of the seat lateral portion 7d in a side view.

The vehicle 1 includes an air cleaner 40 configured to purify air to be supplied to the engine 11. The vehicle 1 includes a fuel tank 50 configured to store fuel to be supplied to the engine 11. The air cleaner 40 and the fuel tank 50 are preferably disposed below the seat 7 (see FIG. 5).

Since both of the air cleaner 40 and the fuel tank 50 are disposed below the seat 7, as described above, a space for the storage case 30 is ensured in front of the seat 7. As a result, it is possible to readily increase the capacity of the storage case 30. Further, as the opening 30a of the storage case 30 is positioned farther forward than the front end 7b of the upper surface of the seat 7, the riders have easy and ready access to the opening 30a. For example, the riders have easy and ready access to the opening 30a while sitting on the seat 7. In other words, the riders are able to access the opening 30a without removing the seat 7.

Note here that "the air cleaner 40 is disposed below the seat 7" includes not only an arrangement in which the air cleaner 40 is disposed lower than the lower edge 7f of the seat lateral portion 7d, but also an arrangement in which the upper portion of the air cleaner 40 is disposed higher than the lower edge 7f of the seat lateral portion 7d (that is, an arrangement in which the upper portion of the air cleaner 40 is disposed between the left and right seat lateral portions 7d) and an arrangement in which the foremost portion of the air cleaner 40 is disposed farther forward than the seat 7.

Further, "the fuel tank 50 is disposed below than the seat 7" includes not only an arrangement in which the entire fuel tank 50 is disposed lower than the lower edge 7f of the seat lateral portion 7d, but also an arrangement in which the upper portion of the fuel tank 50 is disposed higher than the lower edge 7f of the seat lateral portion 7d (an arrangement in which the upper portion of the fuel tank 50 is disposed between the left and right seat lateral portions 7d).

As shown in FIG. 6, the entire storage case 30 is disposed farther forward than the front end 7b of the upper surface of the seat 7. With the above configuration, a space to mount the air cleaner 40 and the fuel tank 50 is readily ensured below the seat 7. Layout of the storage case 30, however, is not limited to the above described preferred embodiments. For example, the rear portion of the storage case 30 may overlap the foremost portion of the seat 7 in a plan view or a side view of the vehicle.

As shown in FIG. 3, the air cleaner 40 is disposed farther rearward than the storage case 30, and the fuel tank 50 is disposed farther rearward than the air cleaner 40. According to the above layout, the air cleaner 40 is located below the front portion of the seat 7, and the fuel tank 50 is located below the rear portion of the seat 7 (see FIG. 5). The width of the front portion of the seat 7 in the left-right direction (the vehicle width direction) is smaller than that of the rear portion of the seat 7 (see FIG. 6). Note that "the fuel tank 50 is disposed farther rearward than the air cleaner 40" in the above description includes not only an arrangement in which the entire fuel tank 50 is disposed farther rearward than the rear end of the air cleaner 40, but also an arrangement in which the front portion of the fuel tank 50 overlaps the rear portion of the air cleaner 40 in a side view or a plan view of the vehicle. Further, "the air cleaner 40 is disposed farther rearward than the storage case 30" includes not only an arrangement in which the entire air cleaner 40 is disposed farther rearward than the rear end of the storage case 30, but also an arrangement in which the front portion of the air cleaner 40 overlaps the rear portion of the storage case 30 in a side view or a plan view of the vehicle. Steps 21 for a rider to rest their feet on are located on the respective left and right sides in the front portion of the seat 7.

When a rider straddles the seat 7, the front portion of the seat 7 is disposed between the left and right legs of the rider. In an arrangement in which a fuel tank is disposed below the front portion of the seat 7, the fuel tank is disposed between the left and right legs of the rider. This arrangement of the tank makes it difficult to increase the capacity of the fuel tank. However, in the arrangement in which the fuel tank 50 is disposed farther rearward than the air cleaner 40, it is possible to ensure the capacity of the fuel tank 50 because the fuel tank 50 is disposed farther rearward than the position of the legs of the rider. In an example, as shown in FIG. 4, the width of the fuel tank 50 in the vehicle width direction is greater than that of the air cleaner 40 and that of the storage case 30.

As shown in FIG. 4, the air cleaner 40 is disposed between the left and right upper frame portions 5a defining the vehicle frame 5 in a plan view of the vehicle. Meanwhile, the fuel tank 50 protrudes in the vehicle width direction beyond the left and right upper frame portions 5a. With the above configuration, it is possible to ensure the capacity of the fuel tank 50. For example, as shown in FIG. 4, the fuel tank 50 preferably protrudes rightward beyond the right upper frame portion 5a in a plan view. However, the fuel tank 50 may protrude leftward beyond the left upper frame portion 5a.

As shown in FIG. 6, the width of the air cleaner 40 in the vehicle width direction is smaller than that of the front portion of the seat 7 in a plan view. This layout increases the freedom for designing the seat 7 so that an appropriately shaped seat for a riding position is provided. Meanwhile, the width of the fuel tank 50 in the vehicle width direction is greater than that of the rear portion of the seat 7. Specifically, as shown in FIG. 6, the fuel tank 50 preferably protrudes rightward beyond the right edge of the seat 7 (beyond the lower edge 7f of the right seat lateral portion 7d) in a plan view.

The air cleaner 40 preferably has a box shaped main body 42 and an intake duct 43 connected to the main body 42 (see FIG. 3). The width of the main body 42 in the up-down direction is greater than that in the left-right direction (the width in the up-down direction corresponds to the distance between the upper surface 42a and the lower surface 42c of the main body 42). According to this configuration of the main body 42, it is possible to ensure the capacity of the main body 42 while preventing any increase in the width of the main body 42 in the left-right direction. The main body 42 of the air cleaner 40 is disposed between the front portion of the seat 7 and the rear portion of the case 11e of the engine 11 in aside view. The shape of the air cleaner 40, however, is not limited to the preferred embodiment shown in FIG. 3. For example, the width of the main body 42 in the up-down direction may be smaller than that in the left-right direction.

The air cleaner 40 overlaps the upper frame portions 5a in a side view of the vehicle. That is, the air cleaner 40 extends downward beyond the upper frame portions 5a in a side view of the vehicle body. The air cleaner 40 is supported by a stay (not shown) extending from the upper frame portion 5a, for example.

The fuel tank 50 is preferably disposed lower than the air cleaner 40 and the storage case 30. Specifically, as shown in FIG. 3, the position of the lower surface 42c of the air cleaner 40 is lower than that of the lower surface of the storage case 30. The lower surface 50d of the fuel tank 50 is disposed lower than the lower surface of the air cleaner 40. This arrangement ensures a lower gravity center of the vehicle body. The upper surface 42a of the main body 42 of the air cleaner 40 is preferably disposed lower than the storage case 30. The upper surface 50c of a portion of the fuel tank 50 disposed below the seat 7 is preferably disposed lower than the upper surface 42a of the main body 42.

The relationship in height between the air cleaner 40, the fuel tank 50, and the case 30 is not limited to the preferred embodiment shown in FIG. 3. For example, the upper surface 42a of the main body 42 of the air cleaner 40 may be disposed higher than the lower surface of the storage case 30. The upper surface 50c of the fuel tank 50 may be disposed higher than the upper surface 42a of the main body 42 of the air cleaner 40.

As described above, the storage case 30 includes the opening 30a through which a rider may insert and remove an object from the storage case 30. The opening 30a is provided on the upper surface 30b of the storage case 30. The opening 30a is preferably positioned in a rear portion of the storage case 30. With the above configuration, a rider has easy and ready access to the opening 30a.

As shown in FIG. 5, the upper surface 30b of the storage case 30 is preferably positioned higher than the front end 7b of the upper surface of the seat 7. The upper surface of the front portion of the seat 7 is inclined relative to the horizontal direction so as to become gradually higher toward the front. In one example, the upper surface 30b and the lower surface 30d of the storage case 30 are oriented closer to horizontal than the upper surface of the front portion of the seat 7.

As shown in FIG. 3, the storage case 30 is disposed above, and supported by, the upper frame portions 5a. Specifically, the storage case 30 is disposed on, for example, crossbars 5k, 5m extending between the left and right upper frame portions 5a (see FIG. 4). The support structure of the storage case 30, however, is not limited to the above described preferred embodiment. For example, the storage case 30 may be disposed on the upper frame portions 5a themselves. As shown in FIG. 4, the width (the maximum width) of the storage case 30 in the vehicle width direction may be greater than the distance between the left and right upper frame portions 5a. The lower portion of the storage case 30 may be disposed between the left and right upper frame portions 5a.

A connecting duct 13 is disposed between the cylinder portion 11a of the engine 11 and the air cleaner 40. The air introduced by the air cleaner 40 is supplied to the cylinder portion 11a through the connecting duct 13. As shown in FIG. 3, the front portion of the storage case 30 is disposed above the cylinder portion 11a and the rear portion of the same is disposed above the connecting duct 13 in a side view of the vehicle body.

As shown in FIG. 7, a cover 32 configured to open and close the opening 30a is provided on the opening 30a of the storage case 30 and exposed to the outside on the exterior surface of the vehicle body. In one example, the cover 32 is a plate shaped member and supported so as to be opened or closed by a hinge 32a attached to the front edge thereof. An engagement portion 32b configured to lock the cover 32 closed is preferably provided on the rear edge of the cover 32.

Preferably, the exterior surface of the vehicle body includes a concave portion 33a at a position corresponding to the rear edge of the cover 32, into which a user places their finger when opening the cover 32. As shown in FIG. 7, the upper surface 30b of the storage case 30 may be covered by the exterior cover 33, which defines the exterior surface of the vehicle body. In this case, the exterior cover 33 may include an opening provided at a position corresponding to the opening 30a. Further, the above described concave portion 33a may be provided on the exterior cover 33. The cover 32 is preferably disposed flush with the exterior cover 33.

Alternatively, the exterior cover 33 may not be provided on the storage case 30. That is, the upper surface 30b of the storage case 30 may define the exterior surface of the vehicle body. In this case, a member that defines the upper surface 30b of the storage case 30 and a member that defines the other portion are preferably molded separately. For example, the storage case 30 may include a box shaped member that is open upward and an upper member attached on the upper side of the box shaped member and defining the exterior surface of the vehicle body. In this case, the opening 30a is provided on the upper member. The exterior cover 33 may be molded integrally with the fender 8 and a cover covering the lateral surface of the engine 11. The exterior cover 33 may include an opening 33c provided on the left side relative to the storage case 30 (see FIG. 7). A shift lever that enables a rider to change the gear ratio preferably projects through the opening 33c.

As shown in FIG. 3, the air cleaner 40 is disposed behind the cylinder portion 11a in a side view of the vehicle body. The cylinder head 11c of the cylinder portion 11a includes an intake port on the rear side thereof to which an intake system is connected. The intake system includes the air cleaner 40 and the connecting duct 13. As shown in FIG. 3, the air cleaner 40 is connected to the intake port of the cylinder head 11c via the connecting duct 13. Because the intake port is on the rear side of the cylinder head 11c, it is possible to prevent elongation of the intake passage (the connecting duct 13) extending from the air cleaner 40 to the cylinder head 11c.

As shown in FIG. 3, the air cleaner 40 is preferably disposed below the front portion of the seat 7 and between the cylinder portion 11a and the fuel tank 50. With the above configuration, it is possible to more effectively prevent elongation of the intake passage (that is, the connecting duct 13) extending from the air cleaner 40 to the cylinder head 11c.

As described above, the seat 7 includes the seat upper portion 7c defining the upper surface thereof and the seat lateral portions 7d extending from the left and right sides of the seat upper portion 7c. The front portion of the seat upper portion 7c is inclined so as to extend forward and upward. The upper surface 42a of the main body 42 of the air cleaner 40 is disposed below the front portion of the seat upper portion 7c and inclined so as to extend forward and upward, as shown in FIG. 3. This arrangement reduces a useless space between the seat 7 and the air cleaner 40, which makes it easier to ensure the capacity of the air cleaner 40.

As described above, the cylinder portion 11a is preferably inclined forward relative to the vertical direction. Meanwhile, the front surface 42b of the main body 42 of the air cleaner 40 is provided rearward relative to the vertical direction, as shown in FIG. 3. That is, the front surface 42b of the main body 42 of the air cleaner 40 is inclined so as to extend upward and rearward. With this configuration, it is possible to ensure, between the main body 42 of the air cleaner 40 and the cylinder portion 11a, a space in which the connecting duct 13 is arranged.

As shown in FIG. 3, the connecting duct 13 includes a throttle body 13a in a midway portion thereof. The throttle body 13a includes, in its inside, a throttle valve to adjust the amount of air flowing from the air cleaner 40 into the cylinder. The throttle body 13a is disposed between the main body 42 of the air cleaner 40 and the cylinder portion 11a. The throttle body 13a preferably includes a fuel supply device (for example, an injector) 13b to supply fuel into the intake passage.

The connecting duct 13 extends diagonally rearward and upward from the cylinder portion 11a and then is bent to extend diagonally rearward and downward to be connected to the front surface 42b of the main body 42 of the air cleaner 40. That is, the connecting duct 13 is bent so that it has an upwardly convex shape. According to this configuration of the connecting duct 13, it is possible to effectively utilize the space between the front surface 42b of the air cleaner 40 and the cylinder portion 11a which are inclined in mutually opposite directions.

As shown in FIG. 3, the air cleaner 40 includes an inlet 43a to introduce outside air to the air cleaner 40. The air cleaner 40 includes the intake duct 43, as described above, and the tip end of the intake duct 43 defines the inlet 43a. As shown in FIG. 6, the inlet 43a is located, for example, between the front end 7b of the upper surface of the seat 7 and the storage case 30 in a plan view of the vehicle. With the above configuration, it is possible to readily heighten the position of the inlet 43a. The "inlet 43a is disposed between the front end 7b of the upper surface of the seat 7 and the storage case 30" in the above description includes not only an arrangement in which the entire inlet 43a is disposed farther forward than the front end 7b of the upper surface of the seat 7, but also an arrangement in which a portion of the inlet 43a overlaps the seat 7 in a plan view. The inlet 43a preferably opens upward.

As shown in FIG. 6, the inlet 43a is disposed between the foremost portions of the left and right seat lateral portions 7d in a plan view. In other words, the inlet 43a is disposed farther rearward than the front ends 7e of the left and right seat lateral portions 7d of the seat 7 in a plan view. The inlet 43a is surrounded by the storage case 30, the foremost portions of the left and right seat lateral portions 7d, and the front end of the seat upper portion 7c in a plan view. According to the above layout, it is possible to effectively utilize the space between the left and right seat lateral portions 7d. The position of the inlet 43a, however, is not limited to the above described preferred embodiment. For example, the inlet 43a may be positioned below the seat upper portion 7c of the seat 7.

As shown in FIG. 3, the intake duct 43 extends diagonally forward and upward from the upper portion of the main body 42, and then is bent to extend upward. The intake duct 43 is disposed between the left and right seat lateral portions 7d, and overlaps the seat lateral portion 7d in a side view. The position of the end portion (that is, the inlet 43a) of the intake duct 43 is higher than that of the front edges 7h of the seat lateral portions 7d of the seat 7 (see FIG. 5). The position and shape of the intake duct 43, however, are not limited to the above described preferred embodiment. For example, the intake duct 43 may extend vertically from the upper surface of the main body 42.

Figure 8:
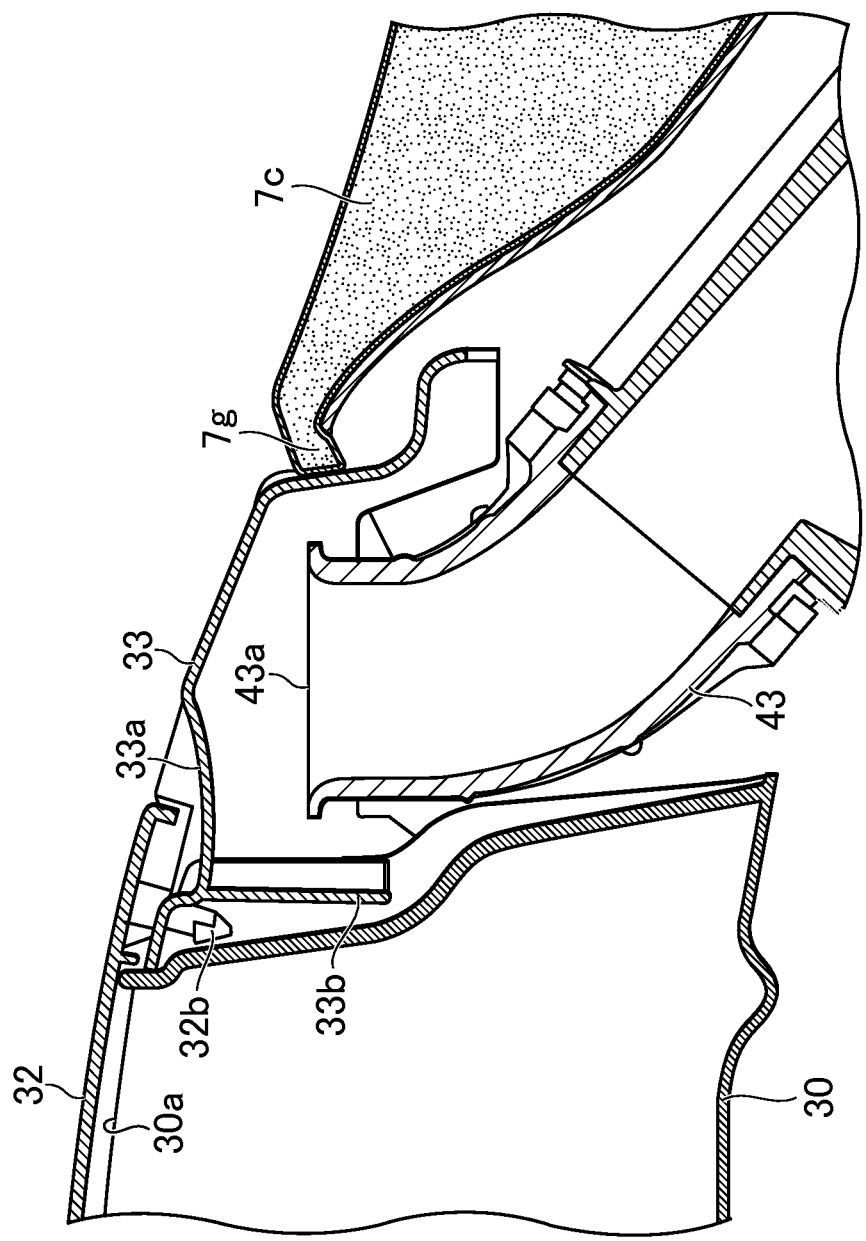
FIG. 8 is a cross-sectional view showing a cross-section along the line VIII-VIII in FIG. 2.

FIG. 8 is a cross-sectional view of a cross-section along the line VIII-VIII in FIG. 2, showing the connecting duct 13 and the front portion of the seat 7. As shown in FIG. 8, the inlet 43a is located, for example, anterior to the front end 7g of the seat upper portion 7c. That is, the inlet 43a is disposed, for example, at the same or substantially same height as the front end 7g of the seat upper portion 7c. The position of the inlet 43a, however, is not limited to the above described preferred embodiment. For example, the inlet 43a may be located lower than that of the front end 7g of the seat upper portion 7c.

The inlet 43a is preferably covered by a cover. In the present example, as shown in FIG. 8, the inlet 43a is covered by the exterior cover 33 covering the storage case 30. In an arrangement in which the exterior cover 33 is not provided to the storage case 30 and the upper surface 30b of the storage case 30 defines the exterior surface of the vehicle body, the inlet 43a may be covered by a member that defines the upper surface of the storage case 30.

As shown in FIG. 8, the exterior cover 33 preferably includes a wall portion 33b extending downward from the exterior cover 33 and surrounding the inlet 43a. With the above configuration, it is possible to prevent the intrusion of water, dust, and so forth into the inlet 43a.

Figure 9:
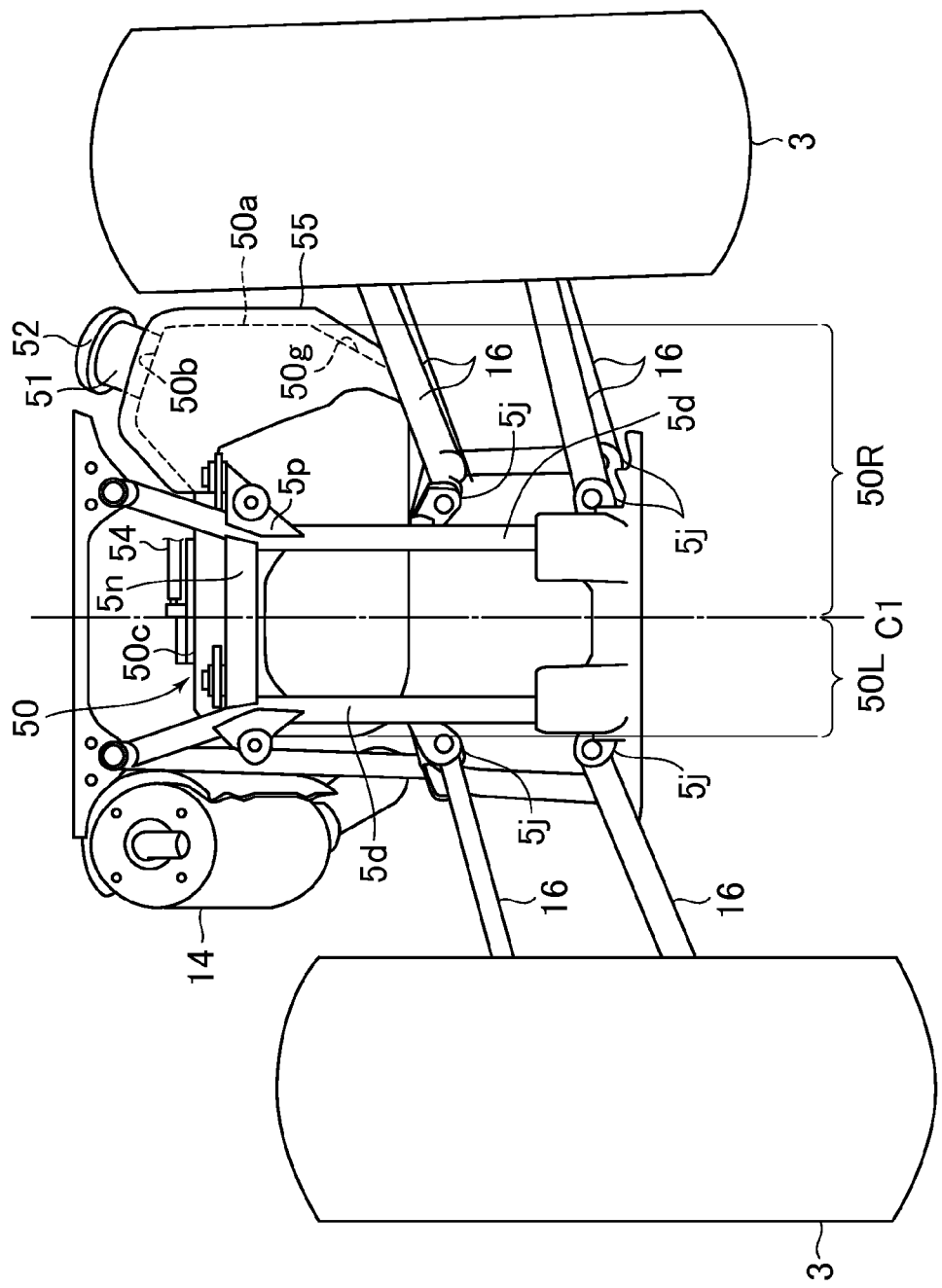
FIG. 9 shows the fuel tank and the rear wheel from the rear side of the vehicle.

FIG. 9 shows the fuel tank 50 and the rear wheels 3 viewed from the rear side. The fuel tank 50 is disposed between the left and right rear wheels 3. As shown in FIG. 4, the fuel tank 50 includes a portion 50R positioned on the right side of the center C1 in the vehicle width direction and a portion 50L disposed on the left side of the center C1 (the respective portions 50R and 50L will be hereinafter referred to as a tank right portion and a tank left portion). At least one of the tank right portion 50R and the tank left portion 50L projects outward in the vehicle width direction beyond the upper frame portion 5a of the vehicle frame 5. Because the fuel tank 50 is disposed below the rear portion of the seat 7, it is possible to ensure the capacity of the fuel tank 50 without being subjected to restrictions due to the shape of the seat 7.

One of the tank right portion 50R and the tank left portion 50L may have a width in the vehicle width direction greater than that of the other. For example, as shown in FIGS. 4 and 9, the width of the tank right portion 50R is greater than that of the tank left portion 50L. The tank right portion 50R protrudes rightward beyond the right upper frame portion 5a. The fuel tank 50 preferably has a width in the vehicle width direction greater than that of the storage case 30 and that of the air cleaner 40, and the tank right portion 50R protrudes rightward in the vehicle width direction farther than the storage case 30 and the air cleaner 40.

Because the tank right portion 50R has a greater width than that of the tank left portion 50L, as described above, it is possible to ensure a space to arrange a component on the outer side from the tank left portion 50L in the vehicle width direction. For example, as shown in FIG. 9, a muffler 14 is disposed on the outer side from the tank left portion L in the vehicle width direction and connected to the cylinder portion 11a via an exhaust pipe (not shown). The muffler 14 is disposed between the left rear wheel 3 and the fuel tank 50 in a plan view of the vehicle body. As shown in FIG. 4, the tank left portion 50L is positioned farther inward than the left upper frame portion 5a. In another example, the tank left portion 50L may protrude leftward beyond the left upper frame portion 5a.

As shown in FIGS. 4 and 9, the tank right portion 50R includes a portion protruding outward in the vehicle width direction beyond the right upper frame portion 5a (this portion 50a will be hereinafter referred to as a protruding portion). The protruding portion 50a protrudes farther upward than a portion (a portion disposed below the seat 7) of the fuel tank 50 positioned between the left and right upper frame portions 5a in a plan view. That is, the upper surface 50b of the protruding portion 50a is located higher than the upper surface 50c of the portion disposed between the left and right upper frame portions 5a, as shown in FIG. 9. With the above configuration, it is possible to further increase the capacity of the fuel tank 50. In one example, the upper end of the protruding portion 50a is located higher than the upper frame portions 5a in a side view of the vehicle body (see FIG. 3). In another example, the upper surface 50b of the protruding portion 50a may not be positioned higher than the upper surface 50c of the portion disposed between the left and right upper frame portions 5a in a plan view.

As shown in FIGS. 4 and 9, the side surface (the right side surface) and the upper surface 50b of the protruding portion 50a are preferably covered by the cover 55. In a plan view, a connection port 53 connected to a fuel hose 54 is provided on the upper surface 50c of a portion disposed between the left and right upper frame portions 5a in a plan view (see FIG. 4).

As shown in FIG. 4, the fuel tank 50 includes a fuel supply port 51 through which fuel is supplied to the fuel tank 50. The fuel supply port 51 projects upward from the upper surface 50b of the protruding portion 50a of the fuel tank 50 (see FIG. 9). A cap 52 is attached to the fuel supply port 51.

Preferably, the fuel supply port 51 is located farther outward than the seat 7 in the vehicle width direction in a plan view, as shown in FIG. 6. That is, preferably, the fuel supply port 51 is located at a position not overlapping the seat 7 in a plan view. With the above, a rider can supply fuel to the fuel tank 50 without removing the seat 7. The fuel supply port 51 in FIG. 6 is disposed farther rightward than the right edge of the seat 7 (the lower edge 7f of the right seat lateral portion 7d).

The fuel tank 50 is covered by the exterior cover 9 including the fender portion 9a covering the rear wheels 3. The cap 52 of the fuel supply port 51 projects from the exterior cover 9 (see FIG. 2).

As shown in FIG. 3, the fuel tank 50 is disposed between the upper frame portions 5a and the arm support portion 5f that support the rear wheels 3 via the arms 16 (see FIG. 9). The fuel tank 50 is supported by the vehicle frame 5. For example, as shown in FIG. 9, the fuel tank 50 is disposed on a stay (not shown) extending from the upper frame portion 5a or the arm support portion 5f. The fuel tank 50 may be disposed on a crossbar 5n or a stay 5p both disposed on the rear frame portion 5d.

As shown in FIG. 9, the rear wheels 3 are supported by the arms 16 so as to move up and down. The lower portion of the protruding portion 50a is configured so as to avoid interference with the arm 16 when the rear wheels 3 move up and down. For example, an inclined surface 50g is provided on the lower portion of the protruding portion 50a so that the protruding portion 50a does not interfere with the arm 16 when the rear wheels 3 move up and down.

The present invention is not limited to the preferred embodiments shown in FIGS. 1 to 9, and various modifications are possible.

For example, the fuel tank 50 may be disposed below the front portion of the seat 7, and the air cleaner 40 may be disposed behind the fuel tank 50.

The width of the tank left portion 50L of the fuel tank 50 in the vehicle width direction may be greater than that of the tank right portion 50R in the vehicle width direction.

Figure 10:
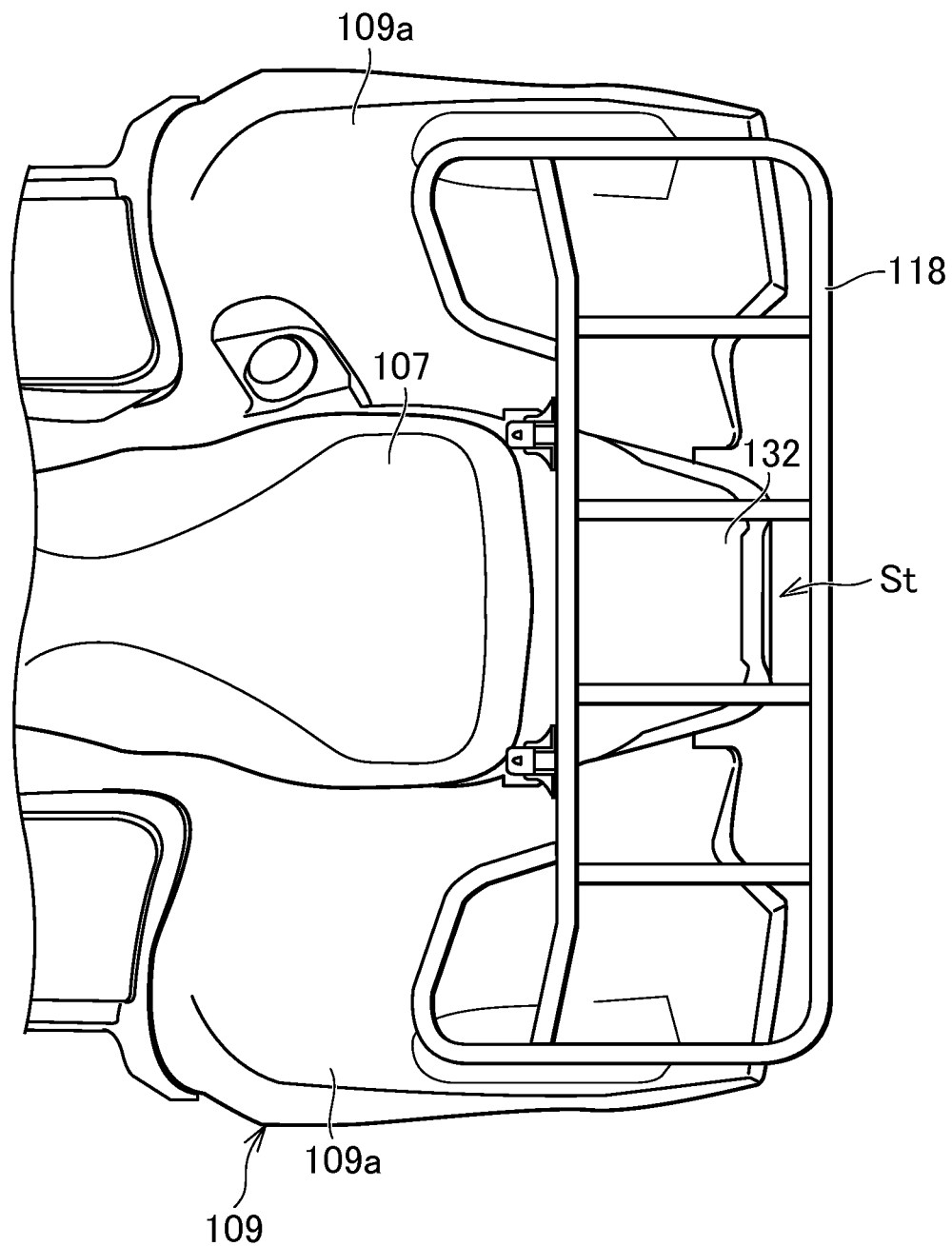
FIG. 10 is a plan view showing another example of the storage portion, showing a rear portion of the vehicle body.
Figure 11:
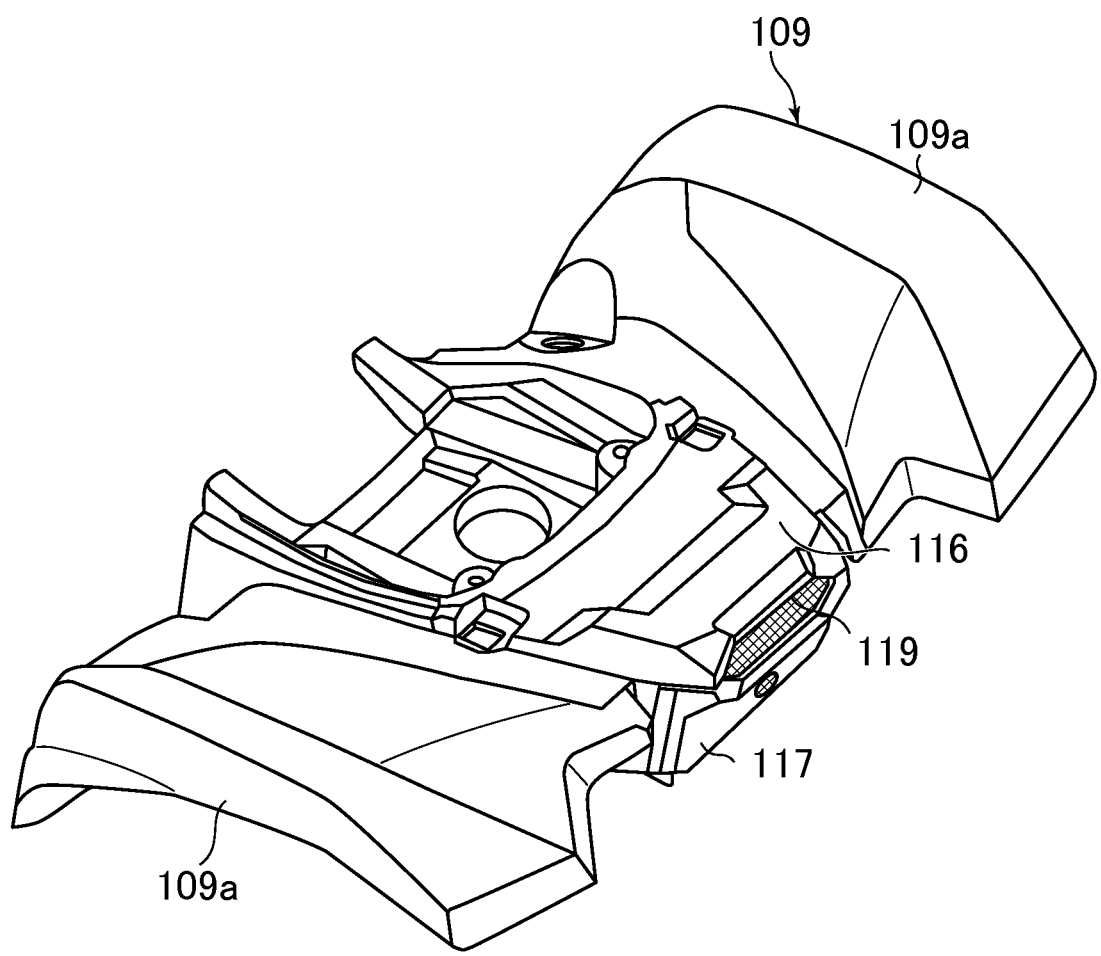
FIG. 11 is a perspective view showing an exterior cover defining the storage portion shown in FIG. 10.
Figure 12:
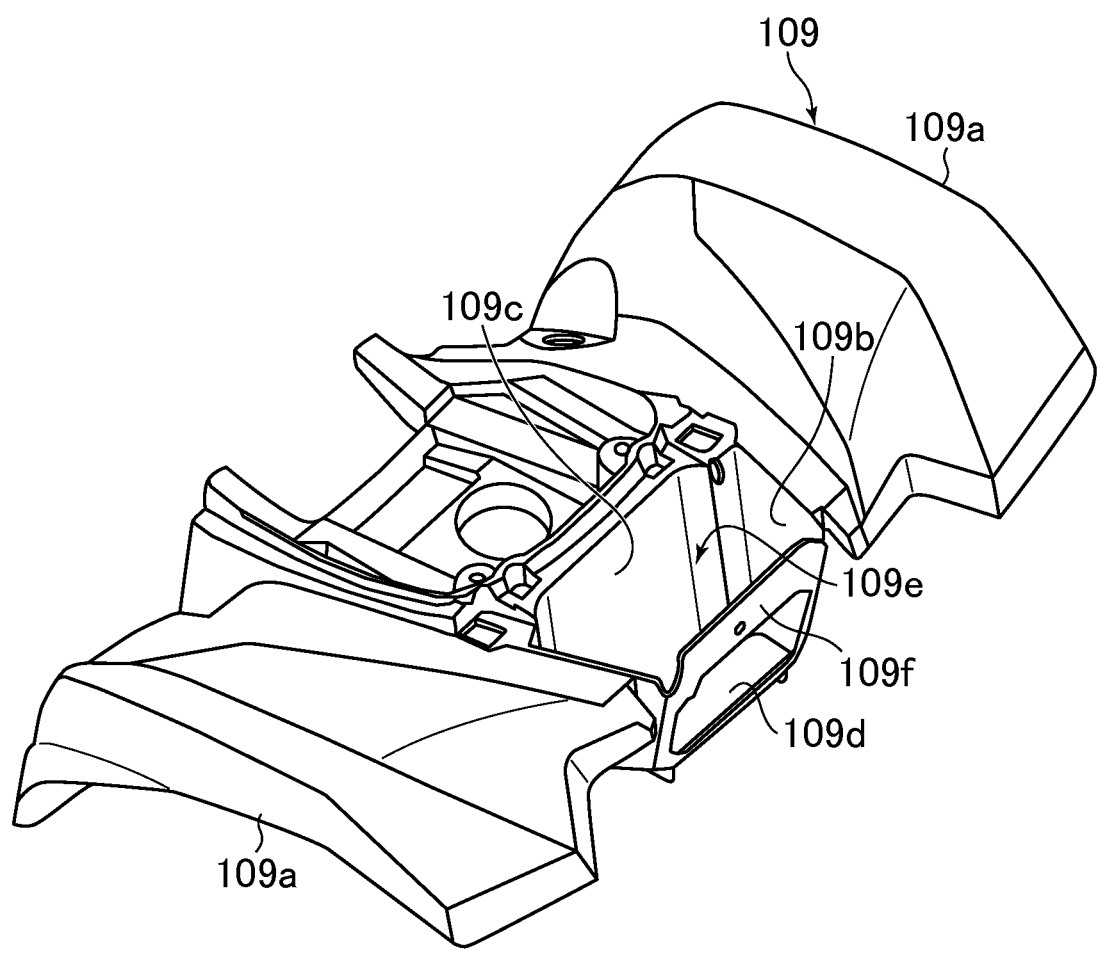
FIG. 12 is a perspective view showing an exterior cover defining the storage portion shown in FIG. 10, in which an upper panel defining the upper surface of the storage portion shown in FIG. 10 and a tail lamp are removed.

FIGS. 10 to 12 show another example of the layout of the storage portion configured to store accessories, such as tools, belongings of the rider, and so forth. In these diagrams, a storage portion St is shown. The storage portion St is disposed in the rear portion of the vehicle body and is different from the storage case 30 shown in FIGS. 1 to 9. FIG. 10 is a plan view of the rear portion of the vehicle body. FIGS. 11 and 12 are perspective views of an exterior cover 109 that defines the storage portion St. In FIG. 12, an upper panel 116 defining the upper surface of the storage portion St, a cover 117, and a tail lamp 119 are removed.

The exterior cover 109 includes fender portions 109*a* covering the respective left and right rear wheels, similar to the above described exterior cover 9. As shown in FIG. 12, the exterior cover 109 includes a plurality of wall portions defining the storage portion St in a position between the left and right fender portions 109*a*. Specifically, as shown in FIG. 12, the exterior cover 109 includes left and right side wall portions 109*b*, a front wall portion 109*c*, and a base portion 109*d* between the left and right fender portions 109*a*. The left and right side wall portions 109*b*, the front wall portion 109*c*, and the base portion 109*d* together define a box shape that is open upward and rearward. A portion of the wall of the storage portion St is formed using these wall portions 109*b*, 109*c*, and the base portion 109*d*. Because the storage portion St is defined by a portion of the exterior cover 109, as described above, a dedicated box member for the storage portion St is not required.

The other portion of the exterior cover 109 is connected to the upper edges of the front wall portion 109*c* and the left and right side wall portions 109*b*. The base portion 109*d* is connected to the lower edges of the front wall portion 109*c* and the side wall portions 109*b*. In the following, the wall portions 109*b*, 109*c*, and the base portion 109*d* will be collectively referred to as a cover recess portion 109*e*. A portion of the exterior cover 109 farther forward than the cover recess portion 109*e* is covered by the seat 107.

As shown in FIG. 11, the storage portion St includes the upper panel 116 and the cover 117, besides the cover recess portion 109*e*. The upper panel 116 is attached to the exterior cover 109 so as to cover the upper side of the cover recess portion 109*e*. The storage portion St is disposed on the rearmost portion of the vehicle body. The cover recess portion 109*e* is open rearward. The cover 117 is attached to the exterior cover 109 so as to cover the rear side of the cover recess portion 109*e*. The cover 117 is capable of being opened and closed. With the above, a rider is able to open and close the cover 117 without removing the seat. A carrier 118 to carry an object (see FIG. 10) is preferably disposed on the upper side of the exterior cover 109. Because the storage portion St is open rearward when the cover 117 is open, a rider has easy and ready access to the storage portion St without removing the carrier 118.

The exterior cover 109 includes a support portion 109*f* that connects the uppermost portions of the respective left and right side wall portions 109*b*. The tail lamp 119 is attached on the support portion 109*f*. This structure locates the tail lamp 119 at a higher position so that visibility of the tail lamp 119 is improved and ensured. The support portion 109*f* increases the strength of the cover recess portion 109*e* defining the storage portion St. An area surrounded by the support portion 109*f* and the left and right side wall portions 109*b* defines the opening.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a seat;
   an engine disposed such that at least a front portion of the engine is positioned farther forward than the seat;
   an air cleaner disposed below the seat and configured to purify air to be supplied to the engine, the air cleaner including an inlet to receive outside air and a main body having a box shape;
   a fuel tank disposed below the seat and configured to store fuel to be supplied to the engine; and
   a storage portion disposed above the engine and including an opening configured such that an object is capable of being inserted into and removed from the storage portion, the opening being located farther forward than a front end of an upper surface of the seat; wherein
   the inlet is located above the main body and behind the storage portion.

2. The vehicle according to claim 1, wherein the air cleaner is disposed farther rearward than the storage portion; and the fuel tank is disposed farther rearward than the air cleaner.

3. The vehicle according to claim 2, wherein the air cleaner is disposed below a front portion of the seat; and the fuel tank is disposed below a rear portion of the seat.

4. The vehicle according to claim 2, wherein the inlet of the air cleaner is located between the front end of the upper surface of the seat and the storage portion.

5. The vehicle according to claim 4, wherein the inlet of the air cleaner is disposed between left and right lateral portions of the seat in a plan view of the vehicle.

6. The vehicle according to claim 1, wherein the opening of the storage portion includes a cover configured to open and close the opening, the cover being exposed on an exterior surface of the vehicle.

7. The vehicle according to claim 1, wherein the engine includes, in the front portion of the engine, a cylinder portion including a cylinder and a cylinder head;
   the air cleaner is disposed behind the cylinder portion in a side view of the vehicle; and
   the cylinder portion includes an intake port provided on a rear side of the cylinder portion and to which an intake system including the air cleaner is connected.

8. The vehicle according to claim 7, wherein the air cleaner is disposed below a front portion of the seat.

9. The vehicle according to claim 7, wherein the air cleaner is disposed between the cylinder portion and the fuel tank.

10. The vehicle according to claim 1, wherein the fuel tank includes a fuel supply port; and
    the fuel supply port is disposed outward from the seat in a vehicle width direction in a plan view of the vehicle.

11. The vehicle according to claim 1, wherein the fuel tank includes a first portion disposed on a right side or a left side of a center of the vehicle in a vehicle width direction and a second portion disposed on an opposite side of the first portion across the center in the vehicle width direction; and
    a width of the first portion in the vehicle width direction is larger than a width of the second portion in the vehicle width direction.

12. The vehicle according to claim 11, wherein the first portion protrudes farther outward in the vehicle width direction beyond the seat in a plan view.

13. The vehicle according to claim 11, further comprising a muffler disposed on an outer side of the second portion of the fuel tank in the vehicle width direction.

14. The vehicle according to claim 1, wherein the fuel tank is disposed between a rear wheel on a right side of the vehicle and a rear wheel on a left side of the vehicle.

15. The vehicle according to claim 1, further comprising a vehicle frame including left and right upper frame portions configured to support the seat and to extend in a front-back direction of the vehicle; wherein
    the fuel tank includes a first portion disposed on a right side or a left side of a center of the vehicle in a vehicle width direction and a second portion disposed on an opposite side of the first portion across the center in the vehicle width direction; and
    at least one of the first portion and the second portion protrudes farther outward in the vehicle width direction beyond the upper frame portion in a plan view of the vehicle.

16. The vehicle according to claim 1, wherein the engine includes, in the front portion of the engine, a cylinder portion; and
    the storage portion is disposed entirely above the cylinder portion of the engine.

17. The vehicle according to claim 1, wherein the engine includes, in the front portion of the engine, a cylinder portion; and
    the storage portion is disposed directly above the cylinder portion of the engine in an up-down direction of the vehicle.

18. The vehicle according to claim 1, wherein the fuel tank is disposed directly below the seat in an up-down direction of the vehicle.

19. The vehicle according to claim 1, wherein the air cleaner is disposed directly below the seat in an up-down direction of the vehicle.

20. The vehicle according to claim 1, wherein the air cleaner includes an intake duct including the inlet at an end thereof, and the intake duct extends from the main body and is located behind the storage portion.

21. A vehicle comprising:
    a seat;
    an engine disposed such that at least a front portion of the engine is positioned farther forward than the seat, the engine including, in the front portion of the engine, a cylinder portion including a cylinder and a cylinder head;
    an air cleaner disposed below the seat and configured to purify air to be supplied to the engine;
    a throttle body including a throttle valve to adjust air flow from the air cleaner into the cylinder;
    a fuel tank disposed below the seat and configured to store fuel to be supplied to the engine; and
    a storage portion disposed above the engine and including an opening configured such that an object is capable of being inserted into and removed from the storage portion, the opening being located farther forward than a front end of an upper surface of the seat; wherein
    the cylinder portion is inclined forward relative to a vertical direction;
    the air cleaner is located rearward of the cylinder portion;
    a front surface of the air cleaner is inclined rearward relative to the vertical direction; and
    the throttle body is disposed between the front surface of the air cleaner and the cylinder portion.

22. The vehicle according to claim 21, further comprising a connecting duct disposed between the cylinder head and the air cleaner and configured to connect the cylinder head and the air cleaner; and
    the connecting duct is bent such that the connecting duct has an upwardly convex shape in a side view of the vehicle.

23. A vehicle comprising:
    a seat;
    a frame including left and right upper frame portions;
    an engine disposed such that at least a front portion of the engine is positioned farther forward than the seat, the engine including, in the front portion of the engine, a cylinder portion including a cylinder;
    an air cleaner disposed below the seat and configured to purify air to be supplied to the engine, the air cleaner including a main body having a box shape;
    a fuel tank disposed below the seat, configured to store fuel to be supplied to the engine, and located between left and right wheels; and
    a storage portion disposed above the engine and including an opening configured such that an object is capable of being inserted into and removed from the storage portion, the opening being located farther forward than a front end of an upper surface of the seat; wherein
    the storage portion is located above the cylinder portion and supported on the left and right upper frame portions; and
    the main body of the air cleaner is located between the left and right upper frame portions and extends downward, below the left and right upper frame portions, so as to be located in front of the fuel tank.

* * * * *